J. I. BRORBY.
MOUSE TRAP.
APPLICATION FILED FEB. 13, 1913.
1,080,623.
Patented Dec. 9, 1913.
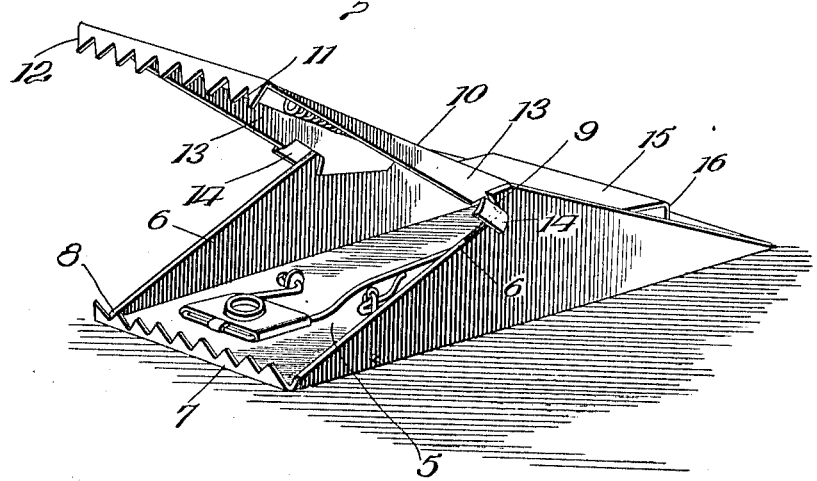
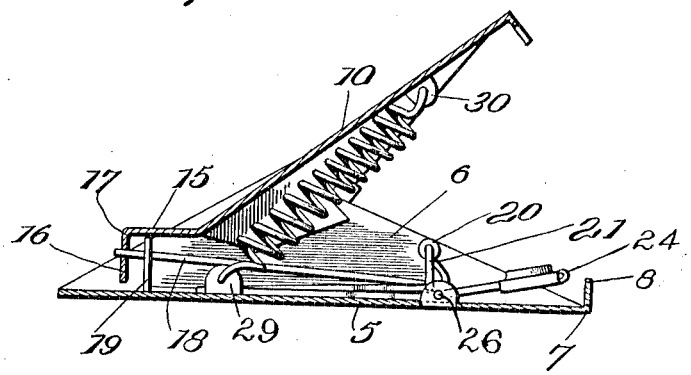
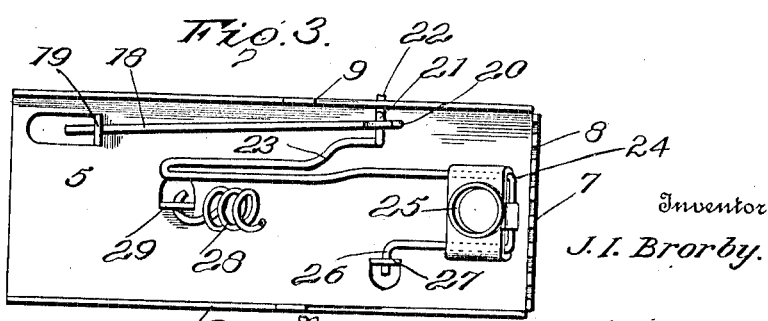
Witnesses
W. Abramson
Dudley Browne
Inventor
J. I. Brorby.
By Browne & Phelps
Attorneys

UNITED STATES PATENT OFFICE.

JACOB I. BRORBY, OF SHENANDOAH, IOWA.

MOUSE-TRAP.

1,080,623.

Specification of Letters Patent.   Patented Dec. 9, 1913.

Application filed February 13, 1913.   Serial No. 748,126.

*To all whom it may concern:*

Be it known that I, JACOB I. BRORBY, a citizen of the United States, residing at Shenandoah, in the county of Page and State of Iowa, have invented certain new and useful Improvements in Mouse-Traps, of which the following is a specification.

My invention relates to certain new and useful improvements in animal traps, and particularly traps adapted to catch mice, rats, or other rodents, and one object of my invention is to provide a trap which shall be very sensitive, that is to say one in which a very slight pressure upon the trigger will release the same, and also one which can be readily set and held open while being baited, without danger of catching the hand of the person setting and baiting the trap.

A further object of my invention is to provide a trap composed of few parts, which can be quickly and easily assembled and taken apart.

A further object of my invention is to provide a trap which shall be cheap to manufacture, durable and not likely to get out of order.

With the foregoing and other objects in view my invention consists in certain constructions, combinations and arrangements of parts the preferred form of which will be first described in connection with the accompanying drawings, and then the invention particularly pointed out in the appended claims.

Referring to the drawings wherein the same part is designated by the same reference numeral wherever it occurs, Figure 1 is a perspective view of a trap showing the same in set position; Fig. 2 is a central longitudinal section of the construction shown in Fig. 1; and Fig. 3 is a top plan view of the base or stationary jaw of the trap, with the pivotal jaw removed and the actuating spring partially cut off.

5 designates the base of the trap which preferably is of rectangular outline as shown, and provided with the upturned sides 6 and the upturned front edge 7 which forms the stationary jaw of the trap. The edge of the jaw may be formed with the saw teeth as indicated at 8, be left straight or given any other configuration as may be found desirable. Preferably and as shown the upturned sides 6 are of the generally triangular form shown with the front edge cut away to form a shoulder 9 as shown.

The movable jaw comprises the body portion 10 with the down turned front portion 11, which forms the jaw proper and the part 11 may be formed into the serrations 12 as shown, be left straight or given any other configuration as may be found most desirable. The sides of the body portion are provided with the down turned flanges 13 and formed in these flanges are the outwardly extending lugs 14 adapted to engage the shoulders 9 and form the pivotal connection between the two parts of the trap. At the rear of the body portion 10 I provide a portion 15 which extends at an angle to the portion 10 and is preferably formed by bending the sheet metal of which the trap is preferably formed. This portion 15 provides a convenient means by which the trap may be held open while placing the bait in position and also reset. The portion 15 at its rear edge is provided with the depending flange 16 provided with the opening 17 into which the end of the wire 18 forming the latch extends when the trap is set.

The latch 18 is guided adjacent its latching end by passing through an opening in a lug 19 carried by the base 5, and the other end of the latch is shown as formed into an eye 20 with which engages the upwardly extending loop 21 of the trigger. The form of trigger shown comprises a pivot 22 extending out from one side of the loop 21 and pivoted in a suitable opening in one of the side plates 6. On the other side of the loop 21 is a backwardly-extending portion 23 which is doubled upon itself and forms a counter weight to balance the trigger. The forward end of the trigger is formed into a U 24 provided with a suitable bait carrying plate 25, and there is also provided a pivot 26 journaled in an upstanding lug 27 from the base 5. While I have shown this trigger as formed with wire it is evident that the same can be formed in any other manner desired, as for instance by stamping the same out of sheet metal.

28 designates the coil spring for operating the trap, one end of the spring being connected to a lug 29 on the base 5, and the other end to a lug 30 on the underside of the plate 10. It will be noted from Fig. 2 that the spring is so connected to the plates 10 and 5 as to almost pull past the center of oscillation of the plates. As a consequence the spring exerts a very slight downward pull on the movable jaw when the trap is in set position, but as the jaw approaches the closed position this pull increases and is at its maximum when the jaws are closed. As a consequence of this construction the trigger which is balanced by the loop 23 requires but a slight touch to withdraw the latch 18 and release the jaw.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. An animal trap comprising a fixed jaw, a movable jaw, pivot connections on the edges of said jaws, a spring connected at one end to the movable jaw in front of said pivot and at its other end to the fixed jaw in the rear of said pivot, an angular extension on the rear of the movable jaw having an opening therethrough, a sliding latch having pivotal connection with means for actuating the same and adapted to enter the opening in the rear of the movable jaw when brought into registry therewith to hold said movable jaw in open position, and means adapted to be operated by the animal to cause rearward movement of said latch to withdraw the same from the opening in the movable jaw to spring the trap.

2. An animal trap comprising a fixed jaw, a movable jaw, pivot connections between said jaws, a spring attached at one end to the movable jaw and at its opposite end to the fixed jaw, an angular extension on the movable jaw having an opening therethrough, a latch having its rear end mounted adjacent the opening in the rear of the movable jaw and having its front end extending through the side of the fixed jaw and provided intermediate its ends with a looped portion forming a bearing, and a trigger having a looped portion intermediate its ends adapted to receive a bait-receiving plate and pivoted at one of its ends in a bearing formed in the fixed jaw and at its opposite end in the loop formed in the trigger, whereby the movement of the bait-receiving plate by the animal will cause said trigger to release said latch and spring the trap.

3. An animal trap comprising a fixed jaw having the upper edge of the front portion of its side walls cut at a lower plane than the rear portion of such walls and terminating at a point short of the center thereof, whereby to form a forwardly extending shoulder, and a movable jaw having portions struck from the edges of its side walls and bent to seat against said shoulders, and a spring having one of its ends connected to the stationary jaw and its other end connected to the movable jaw to hold said jaws in pivotal relation with each other.

4. An animal trap comprising a fixed jaw, a movable jaw, pivot connections on the edges of said jaws, a spring connected at one end to the fixed jaw and at its opposite end to the movable jaw, an angular extension on the movable jaw having an opening therethrough, a sliding latch having its rear end mounted adjacent the opening in the rear of the movable jaw adapted to be guided into said opening by the angular extension on the movable jaw when the rear end of said jaw is depressed to set the trap, and means adapted to be operated by the animal to cause rearward movement of said latch to withdraw the same from the opening in the movable jaw to spring the trap.

In testimony whereof I affix my signature in presence of two witnesses.

JACOB I. BRORBY.

Witnesses:
 LAURENCE NYE,
 E. F. VINCENT.